United States Patent
Park (10) Patent No.: US 12,032,931 B2
(45) Date of Patent: Jul. 9, 2024

(54) COMPILING METHOD AND APPARATUS FOR NEURAL NETWORKS

(71) Applicant: Samsung Electronics Co., Ltd., Suwon-si (KR)

(72) Inventor: Keunmo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/215,712

(22) Filed: Mar. 29, 2021

(65) Prior Publication Data

US 2022/0075606 A1 Mar. 10, 2022

(30) Foreign Application Priority Data

Sep. 9, 2020 (KR) .................. 10-2020-0115602

(51) Int. Cl.
*G06F 8/41* (2018.01)
*G06N 3/04* (2023.01)
*G06N 3/10* (2006.01)

(52) U.S. Cl.
CPC .................. *G06F 8/41* (2013.01); *G06N 3/04* (2013.01); *G06N 3/10* (2013.01)

(58) Field of Classification Search
None
See application file for complete search history.

(56) References Cited

U.S. PATENT DOCUMENTS

| | | | |
|---|---|---|---|
| 6,667,920 B2 | 12/2003 | Wolrich et al. | |
| 10,095,957 B2 | 10/2018 | Kulkarni et al. | |
| 10,650,278 B1 | 5/2020 | Ho et al. | |
| 10,725,837 B1* | 7/2020 | Dash | G06F 9/52 |
| 11,138,019 B1* | 10/2021 | Sastry | G06F 8/443 |
| 2003/0210574 A1 | 11/2003 | Wolrich et al. | |
| 2016/0162406 A1* | 6/2016 | Latorre | G06F 12/0811 |
| | | | 711/122 |
| 2017/0270387 A1 | 9/2017 | Kulkarni et al. | |
| 2018/0225368 A1 | 8/2018 | Grond | |
| 2018/0341495 A1 | 11/2018 | Culurciello et al. | |
| 2018/0364994 A1* | 12/2018 | Toper | G06F 11/3616 |
| 2019/0132344 A1 | 5/2019 | Lem et al. | |
| 2019/0179858 A1 | 6/2019 | Douze et al. | |
| 2019/0220734 A1 | 7/2019 | Ferdman et al. | |
| 2019/0278574 A1* | 9/2019 | Ravishankar | G06F 16/9024 |
| 2019/0392296 A1 | 12/2019 | Brady et al. | |

OTHER PUBLICATIONS

Della Rossa, Fabio, et al., "Profiling core-periphery network structure by random walkers," *Scientific reports*, 3, 1, 2013 (pp. 1-8).

(Continued)

*Primary Examiner* — Lewis A Bullock, Jr.
*Assistant Examiner* — Mark A Gooray
(74) *Attorney, Agent, or Firm* — NSIP Law (57) ABSTRACT

Disclosed are compiling methods and apparatuses, where a compiling method includes receiving a single-core-based code and input data for an operation to be performed based on the single-core-based code, generating kernel clusters by performing graph clustering based on one or more operation kernels in the single-core-based code and the input data, and generating a multi-core-based code based on the kernel clusters.

12 Claims, 7 Drawing Sheets

(56) References Cited

OTHER PUBLICATIONS

Ankit, Aayush, et al., "TraNNsformer: Neural Network Transformation for Memristive Crossbar based Neuromorphic System Design," *2017 IEEE/ACM International Conference on Computer-Aided Design (ICCAD). IEEE*, 2017 (pp. 533-540).

Ma, Lingxiao, et al., "Towards Efficient Large-Scale Graph Neural Network Computing," *arXiv preprint arXiv:1810.08403*, Oct. 19, 2018 (pp. 1-14).

Ogawa, Eri et al., "A Compiler for Deep Neural Network Accelerators to Generate Optimized Code for a Wide Range of Data Parameters from a Hand-crafted Computation Kernel", *IBM*, 2019 (pp. 1-14).

\* cited by examiner

COMPILING METHOD AND APPARATUS FOR NEURAL NETWORKS

CROSS-REFERENCE TO RELATED APPLICATIONS

This application claims the benefit under 35 USC § 119(a) of Korean Patent Application No. 10-2020-0115602 filed on Sep. 9, 2020, in the Korean Intellectual Property Office, the entire disclosure of which is incorporated herein by reference for all purposes.

BACKGROUND

Field

The following description relates to a compiling method and apparatus for neural networks.

Description of Related Art

A conventional compiling method for a neural network generally deals with a scenario in which a deep neural network (DONN) operation is performed by a single core. In addition, the conventional compiling method generates code by clustering repetitive execution units of repetitive unit kernels by a loop schedule in consideration of the scratchpad memory size required simply for executing the unit kernels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a compiling method, including receiving a single-core-based code and input data for an operation to be performed based on the single-core-based code, generating kernel clusters by performing graph clustering based on one or more operation kernels in the single-core-based code and the input data, and generating a multi-core-based code based on the kernel clusters.

The input data may include an operand for an operation included in a neural network and a parameter of the neural network.

The generating of the kernel clusters may include generating a graph representing a relationship between the one or more operation kernels and the input data based on the one or more operation kernels and the input data, and generating the kernel clusters by clustering the one or more operation kernels based on the graph.

The generating of the graph may include generating one or more nodes corresponding to the one or more operation kernels, and generating an edge connecting the nodes based on a similarity between input data used by the one or more operation kernels.

The generating of the edge may include calculating the similarity based on the number of pieces of input data shared by the one or more operation kernels, and generating the edge based on the similarity.

The calculating may include assigning an additional weight to the similarity based on locations at which the input data are stored.

The assigning may include assigning the additional weight to the similarity in response to the input data being stored adjacent to each other.

The compiling method may include distributing the one or more operation kernels and the input data to cores based on the multi-core-based code.

The distributing may include distributing one of the operation kernels to one of the cores based on the multi-core-based code, and storing input data corresponding to the one operation kernel based on the multi-core-based code.

In another general aspect, there is provided a compiling apparatus, including a receiver configured to receive a single-core-based code and input data for an operation to be performed based on the single-core-based code, and a processor configured to generate kernel clusters by performing graph clustering based on one or more operation kernels in the single-core-based code and the input data, and to generate a multi-core-based code based on the kernel clusters.

The input data may include an operand for an operation included in a neural network and a parameter of the neural network.

The processor may be configured to generate a graph representing a relationship between the one or more operation kernels and the input data based on the one or more operation kernels and the input data, and generate the kernel clusters by clustering the one or more operation kernels based on the graph.

The processor may be configured to generate one or more nodes corresponding to the one or more operation kernels, and generate an edge connecting the nodes based on a similarity between input data used by the one or more operation kernels.

The processor may be configured to calculate the similarity based on the number of pieces of input data shared by the one or more operation kernels, and generate the edge based on the similarity.

The processor may be configured to assign an additional weight to the similarity based on locations at which the input data are stored.

The processor may be configured to assign the additional weight to the similarity in response to the input data being stored adjacent to each other.

The processor may be configured to distribute the one or more operation kernels and the input data to cores based on the multi-core-based code.

The processor may be configured to distribute one of the operation kernels to a core of the cores based on the multi-core-based code, and store input data corresponding to the one operation kernel based on the multi-core-based code.

The processor may be configured to store the input data corresponding to the one operation kernel in a scratchpad memory connected to the core.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms such as first, second, A, B, (a), (b) may be used herein to describe various members, components, regions, layers, or sections, these members, components, regions, layers, or sections are not to be limited by these terms. These terms should be used only to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. The sequences, or the orders of the constituent elements are not limited by these terms.

When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

Figure 1:
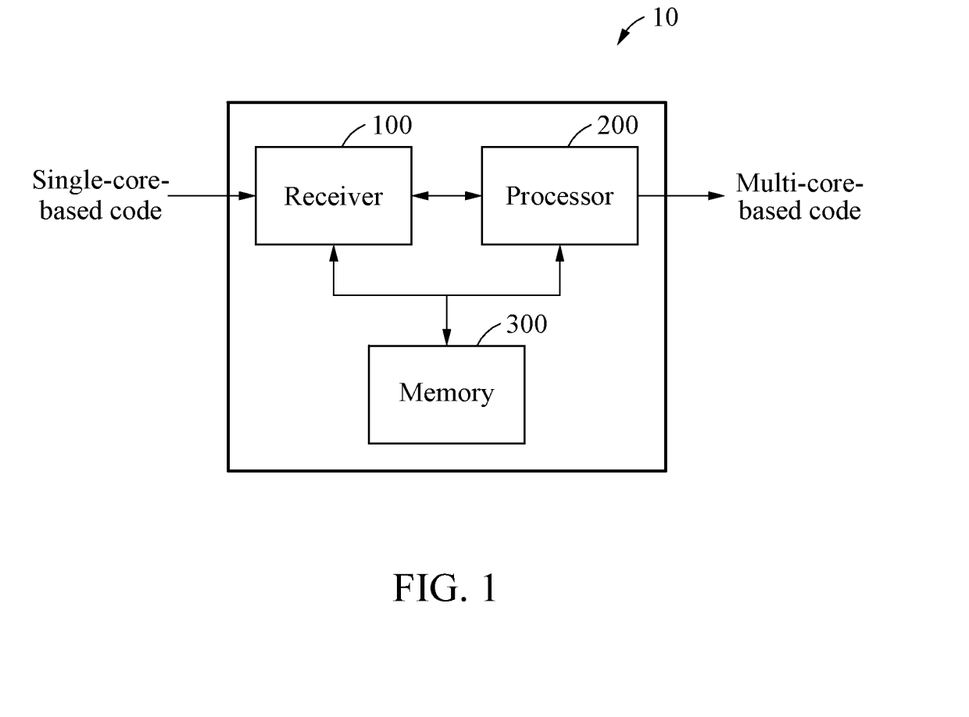
FIG. 1 illustrates an example of a compiling apparatus.

FIG. 1 illustrates an example of a compiling apparatus.

Referring to FIG. 1, a compiling apparatus 10 may perform compilation. The compiling apparatus 10 may translate a document written in one programming language into another programming language. The compiling apparatus 10 may translate a source code into a target code. The source code may be the original document, and the target code may be an output document.

The compiling apparatus 10 may generate a multi-core-based code based on a single-core-based code. Code may be text of a computer program written in a human-readable programming language.

A single-core processor may refer to a processor with one core, and a multi-core processor may refer to a processor in which two or more independent cores are integrated into one package including a single integrated circuit. For example, the single-core processor and/or the multi-core processor may include a neural processing unit (MPU) core.

The compiling apparatus 10 may generate the multi-core-based code by processing the single-core-based code. The compiling apparatus 10 may generate the multi-core-based code to perform an operation included in a neural network.

A neural network (or an artificial neural network) includes a statistical training algorithm that has an ability to solve a problem, where artificial neurons (nodes) forming the network through synaptic combinations change a connection strength of synapses through training.

In an example, the neural network may include a plurality of layers. The plurality of layers may include an input layer, at least one hidden layer, and an output layer. A layer may include a plurality of nodes. The neural network may map input data and output data that have a nonlinear relationship based on deep learning to perform tasks such as, for example, speech recognition and image recognition.

The neural network may be trained to perform a desired operation by mapping input data and output data that have a nonlinear relationship therebetween through deep learning to perform various tasks. For example, a neural network may be trained through deep learning as a problem-solving process for optimization to find a point where energy is minimized while training the neural network using provided training data. Through deep learning, for example, supervised or unsupervised learning, weighted connections and other parameters corresponding to an architecture or a model of the neural network may be obtained, and the input data and the output data may be mapped to each other based on the obtained weight. In an example training, a parameter of each of the nodes of the neural network may be adjusted while an error of a result output by the output layer may be propagated backward along the neural network.

In the neural network, if unit kernels using the same input data are clustered and scheduled, it is possible to use the limited scratchpad memory more efficiently. To reduce the overall memory access cost by efficiently utilizing scratchpad memory to perform an operation by distributing a single DNN operator to several cores, disclosed are methods and apparatuses of scheduling the repetitive unit kernels to multiple cores and managing input data to be stored in the scratchpad memory.

The neural network may include a deep neural network (DNN). The neural network may include neural networks such as, for example a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The operation included in the neural network may include repetitive operations for performing the same operation. To perform the forgoing, the single-core-based code may include one or more loop statements. The compiling apparatus 10 may generate the multi-core-based code, thereby effectively distributing the repetitive operations corresponding to the loop statements to more than one core and efficiently using hardware operation resources.

The compiling apparatus 10 includes a receiver 100 and a processor 200. The compiling apparatus 10 may further include a memory 300.

The receiver 100 may receive a single-core-based code and input data on which an operation is to be performed based on the single-core-based code. The input data may include an operand for the operation included in the neural network and a parameter of the neural network.

The operand may include data on which the neural network operation is to be performed. The parameter of the neural network may include a model parameter or a weight.

The receiver 100 may output the received single-core-based code and the input data to the processor 200.

The processor 200 processes data stored in the memory 300. The processor 200 may execute a computer-readable code (for example, software) stored in the memory 300 and instructions triggered by the processor 200.

The "processor 200" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, a multiprocessor, an application-specific integrated circuit (ASIC), a field-programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 200 is given below.

The processor 200 may generate kernel clusters by performing graph clustering based on one or more operation kernels included in the single-core-based code and the input data.

The processor 200 may generate a graph representing a relationship between the one or more operation kernels and the input data based on the operation kernels and the input data. In detail, the processor 200 may generate one or more nodes corresponding to the one or more operation kernels. The processor 200 may generate an edge connecting the nodes based on a similarity between input data used by the one or more operation kernels.

The nodes and edge of the graph will be described in detail with reference to FIGS. 6 and 7.

The processor 200 may calculate the similarity based on the number of pieces of input data shared by the one or more operation kernels. The processor 200 may generate the edge based on the calculated similarity. In an example, the processor 200 may assign an additional weight to the similarity based on locations at which the input data are stored. The operation of calculating the similarity and the operation of assigning the additional weight will be described in detail with reference to FIGS. 6 and 7.

The processor 200 may generate the kernel clusters by clustering the one or more operation kernels based on the generated graph. The processor 200 may generate a multi-core-based code based on the generated kernel clusters.

The processor 200 may distribute the one or more operation kernels and the input data to cores based on the multi-core-based code. The processor 200 may distribute one of the operation kernels to one of the cores based on the multi-core-based code. The processor 200 may store input data corresponding to the one operation kernel based on the multi-core-based code.

The memory 300 may store instructions (or programs) executable by the processor. For example, the instructions may include instructions to perform an operation of the processor and/or an operation of each element of the processor.

The memory 300 is implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nano-tube RRAM, a polymer RAM (PoRAM), a nano floating gate Memory (NFGM), a holographic memory, a molecular electronic memory device), or an insulator resistance change memory. Further description of the memory 300 is given below.

Figure 2:
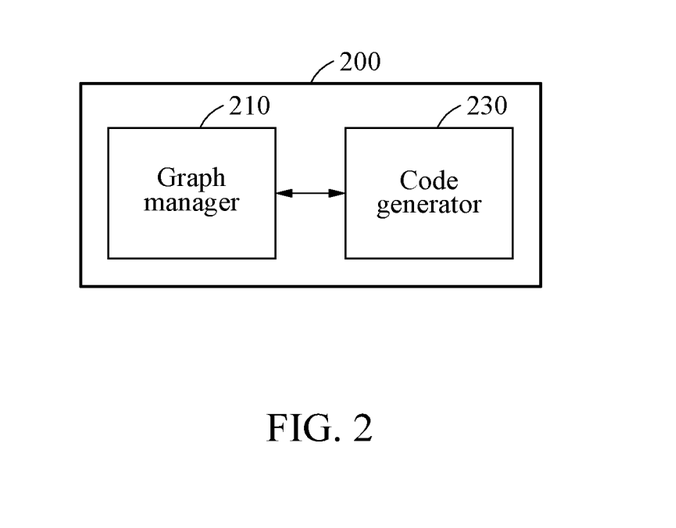
FIG. 2 illustrates an example of a processor shown in FIG. 1.
Figure 3:
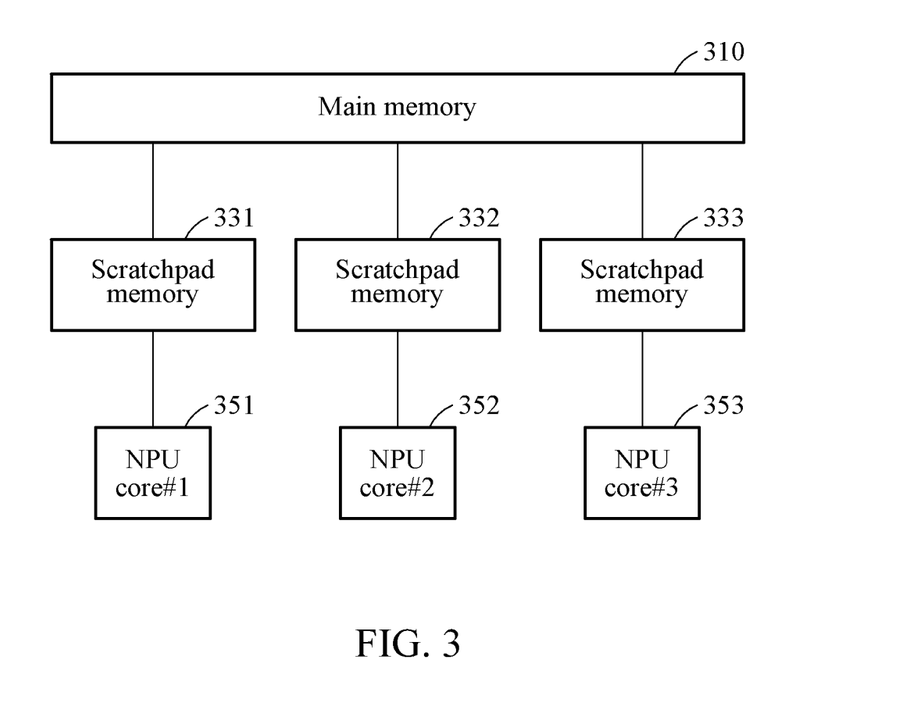
FIG. 3 illustrates an example of connections between a memory shown in FIG. 1 and cores.

FIG. 2 illustrates an example of a processor shown in FIG. 1, and FIG. 3 illustrates an example of connections between a memory shown in FIG. 1 and cores.

Referring to FIGS. 2 and 3, the processor 200 may include a graph manager 210 and a code generator 230. The processor 200 may include NPU cores 351, 352, and 353. The memory 300 may include a main memory 310 and scratchpad memories 331, 332, and 333.

The processor 200 may utilize a multi-core-based code from a single-core-based code. The processor 200 may generate the multi-core-based code. The single-core-based code may include a sequential, single-core-based deep neural network (DNN) operator code. The multi-core-based code may include a DNN operator binary code.

The graph manager 210 may analyze unit kernels included in the single-core-based code to generate an optimal multi-core-based code, and perform scheduling to efficiently utilize the scratchpad memories 331, 332, and 333.

The graph manager 210 may generate kernel clusters by performing graph clustering based on one or more operation kernels included in the single-core-based code and input data.

The graph manager 210 may generate a graph representing a relationship between the one or more operation kernels and the input data based on the operation kernels and the input data.

The graph manager 210 may generate one or more nodes corresponding to the one or more operation kernels, and may generate an edge connecting the nodes based on a similarity between input data used by the one or more operation kernels.

The graph manager 210 may calculate the similarity based on the number of pieces of input data shared by the one or more operation kernels, and generate the edge based on the similarity. The graph manager 210 may assign an additional weight to the similarity based on locations at which the input data are stored. For example, the graph manager 210 may assign the additional weight to the similarity in response to the input data being stored adjacent to each other.

The graph manager 210 may generate the kernel clusters by clustering the one or more operation kernels based on the graph. The process of generating the kernel clusters will be described in detail with reference to FIGS. 6 and 7.

The code generator 230 may generate the multi-core-based code based on the kernel clusters. When generating a binary to execute unit kernels scheduled for the respective NPU cores 351, 352, and 353, the code generator 230 may load input data required by the unit kernels scheduled for the NPU cores 351, 352, and 353 to the scratchpad memories 331, 332, and 333, respectively, and generate an executable code.

The scratchpad memories 331, 332, and 333 may be implemented as high-speed internal memories used for operations, data, and temporary storage during other processes. The scratchpad memories 331, 332, and 333 may operate relatively fast compared to the main memory 310.

The scratchpad memory 331 may receive data from the main memory 310, temporarily store the data, and output the temporarily stored data to the NPU core 351. The scratchpad memory 332 may receive data from the main memory 310, temporarily store the data, and output the temporarily stored data to the NPU core 352. Likewise, the scratchpad memory 332 may receive data from the main memory 310, temporarily store the data, and output the temporarily stored data to the NPU core 353.

The compiling apparatus 10 may use the scratchpad memories 331, 332, and 333 connected between the main memory 310 and the NPU cores 351, 352, and 353, thereby resolving the issue of the performance of the NPU cores 351, 352, and 353 limited by the performance of the main memory 310 due to the difference in the operation speed between the NPU cores 351, 352, and 353 and the main memory 310.

In other words, the compiling apparatus 10 may use the scratchpad memories 331, 332, and 333, thereby utilizing the performance of the NPU cores 351, 352, and 353, and enhancing their performance.

Figure 4:
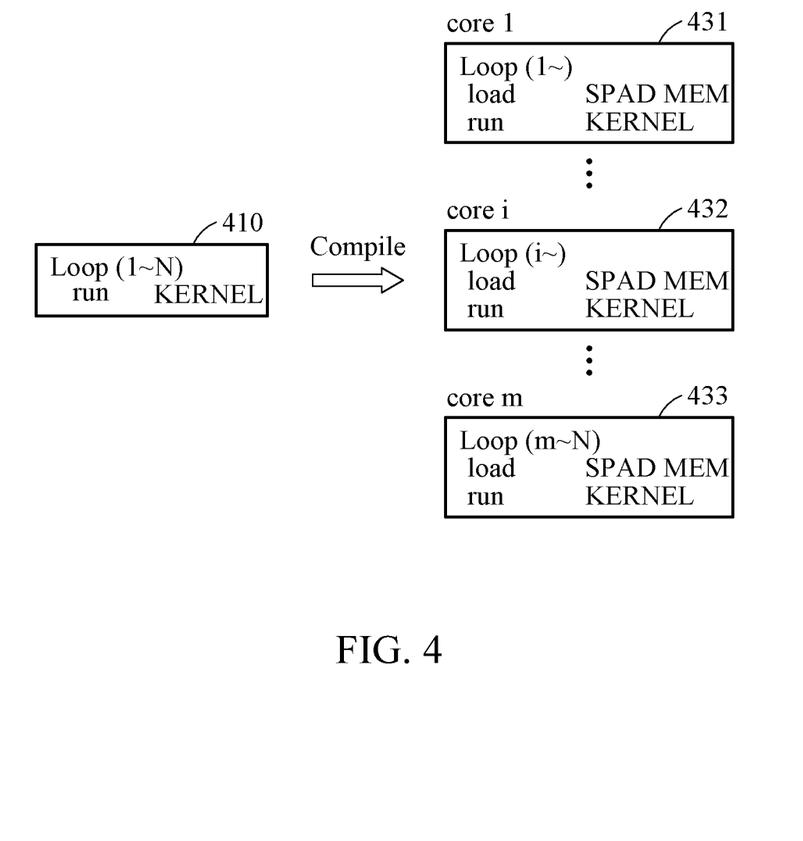
FIG. 4 illustrates an example of generating a multi-core-based code from a single-core-based code.
Figure 5:
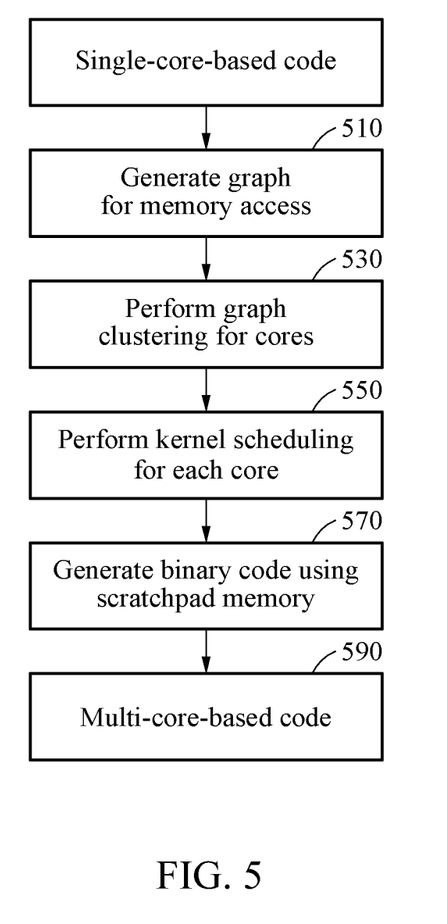
FIG. 5 illustrates an example of generating a multi-core-based code by the compiling apparatus of FIG. 1.

FIG. 4 illustrates an example of generating a multi-core-based code from a single-core-based code, and FIG. 5 illustrates an example of generating a multi-core-based code by the compiling apparatus of FIG. 1. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In an example, the operating method of FIG. 5 may be performed by a processor included in the compiling apparatus 10. In addition to the description of FIG. 5 below, the descriptions of FIGS. 1-4 are also applicable to FIG. 5, and are incorporated herein by reference. Thus, the above description may not be repeated here.

Referring to FIGS. 4 and 5, a neural network operation may be performed using repetitive execution of unit kernels. The processor 200 may generate a multi-core-based code by clustering the unit kernels that use the same input data, thereby more efficiently using scratchpad memories.

The processor 200 may distribute and schedule unit kernels included in a single-core-based code 410 to cores 431, 432, and 433, thereby reducing the overall memory access cost.

The processor 200 may reduce the memory access cost by increasing the reuse of input data stored in the scratchpad memories. When distributing the unit kernels to the cores 431, 432, and 433 and processing the unit kernels, the processor 200 may perform scheduling to increase the number of times the unit kernels reuse the input data in the scratchpad memories.

The processor 200 may generate code for processing a neural network operation of simultaneously utilizing the cores 431, 432, and 433. As described above, the memory 300 may include the main memory 310 shared by the cores 431, 432, and 433, and scratchpad memories allocated respectively to the cores.

The processor 200 may generate code for performing neural network operations on input data of various sizes by repeatedly performing small unit kernels implemented to be suitable for performing each neural network operation.

The processor 200 may process a single-core-based code that is written without considering scratchpad memories and multiple cores, thereby generating a multi-core-based code that accelerates the neural network operations by utilizing the scratchpad memories and the multiple cores.

A unit kernel implemented for each neural network operation may be an operation code that is optimized in consideration of the hardware properties of a DNN accelerator. The unit kernel may be a building block of the smallest unit operation that is used to construct code corresponding to a neural network operation of processing input data.

Unit kernels that are repeated while a neural network operation is performed may be designed to be performed independently (in parallel). Therefore, regardless of the execution order of the repeated unit kernels, a correct result of the neural network operation may always be output when the repeated execution of the unit kernels is completed.

The single-core-based code is a code for processing neural network operations, and may include a loop statement that repeats a given unit kernel for each neural network operation.

The unit kernels may have the same logic. The processor 200 may generate different results by inputting different input data into the unit kernels for each iteration of the loop described above, and combine the different results to derive a final neural network operation result.

In operation 510, the graph manager 210 may generate a graph for memory access. The graph manager 210 may represent the unit kernels using the graph by analyzing the memory 300 access pattern of the unit kernels repeated in the different input data to process one neural network operation.

The graph manager 210 may generate nodes corresponding to the unit kernels executed with the different input data, and generate the graph so that the weight of an edge of the nodes increases when the unit kernels use the same area of the memory 300 as the input data.

In operation 530, the graph manager 210 may perform graph clustering for cores. The graph manager 210 may perform clustering for the graph to optimize the utilization of the memory 300 by allocating unit kernels that use similar input data to the same core in the neural network operation represented by the graph.

In operation 550, the processor 200 may perform kernel scheduling for each core. Through the graph clustering described above, unit kernels to be executed by each core may be determined. In operation 570, the processor 200 may generate binary code using scratchpad memory. If the size of input data used by unit kernels to be executed by one core is larger than a scratchpad memory, the processor 200 may perform scheduling between the unit kernels.

The processor 200 may further include a kernel scheduler configured to perform scheduling for separate unit kernels. The processor 200 may use the kernel scheduler to perform scheduling by analyzing the memory 300 access pattern of each unit kernel for the input data and the size of scratchpad memories.

When executing the scheduled unit kernels, the code generator 230 may generate a multi-core-based code for finally performing the neural network operation by inserting code for loading and storing data into the scratchpad memories. Through the operation described above, in 590, the processor 200 may generate a multi-core-based code optimized for the number of cores by processing a single-core-based code that is previously written.

Hereinafter, the process of generating a graph and performing graph clustering will be described with reference to FIGS. 6 and 7.

Figure 6:
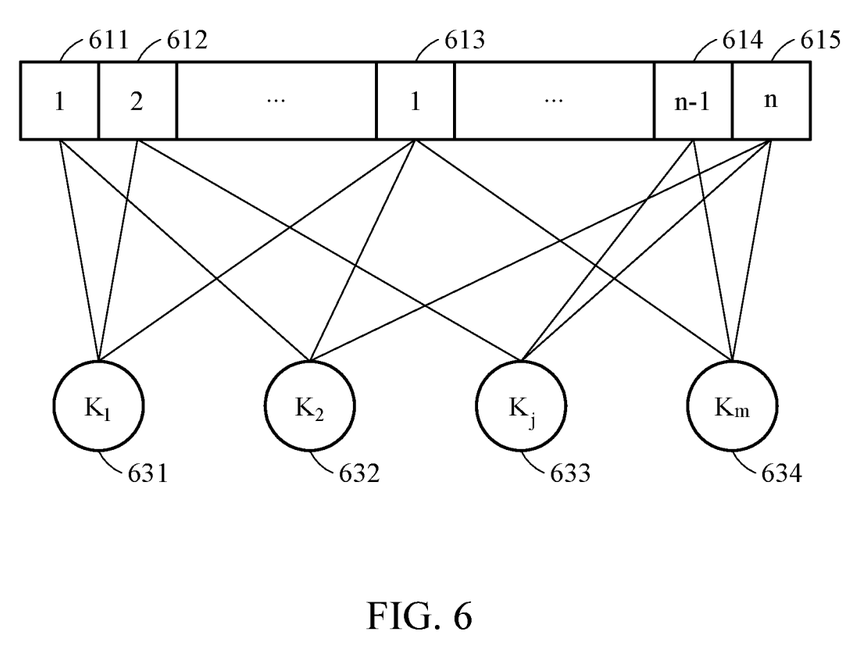
FIG. 6 illustrates an example of generating a graph from kernels and data.

FIG. 6 illustrates an example of generating a graph from kernels and data.

Referring to FIG. 6, the graph manager 210 may generate kernel clusters by performing graph clustering based on one or more operation kernels included in a single-core-based code and input data.

The graph manager 210 may generate a graph representing a relationship between the one or more operation kernels and input data 611 to 615 based on the operation kernels and the input data 611 to 615.

The graph manager 210 may generate nodes 631 to 634 corresponding to one or more operation kernels. Although four nodes and n pieces of input data are used in the example of FIG. 6, the number of nodes and the number of pieces of input data may vary depending on examples.

In the example of FIG. 6, the operation kernel corresponding to the node 631 may use the input data 611, 612, 613, and the operation kernel corresponding to the node 632 may use the input data 611, 613, 615. The operation kernel corresponding to the node 633 may use the input data 612, 614, and 615, and the operation kernel corresponding to the node 634 may use the input data 613, 614, and 615.

The graph manager 210 may generate an edge connecting nodes based on a similarity between input data used by one or more operation kernels. The similarity may be the number of pieces of input data shared by one or more operation kernels. In an example, the graph manager 210 may assign a weight to the edges based on the number of input data shared by the nodes 631 to 634.

For example, the node 631 and the node 632 may share the input data 611 and 613. In this case, the graph manager 210 may assign 2, which is the number of shared input data, to the edge connecting the node 631 and the node 632 as a weight.

Similarly, since the node 632 and the node 633 share a single piece of input data 615, the graph manager 210 may assign a weight of 1 to the edge connecting the node 632 and the node 633.

Figure 7:
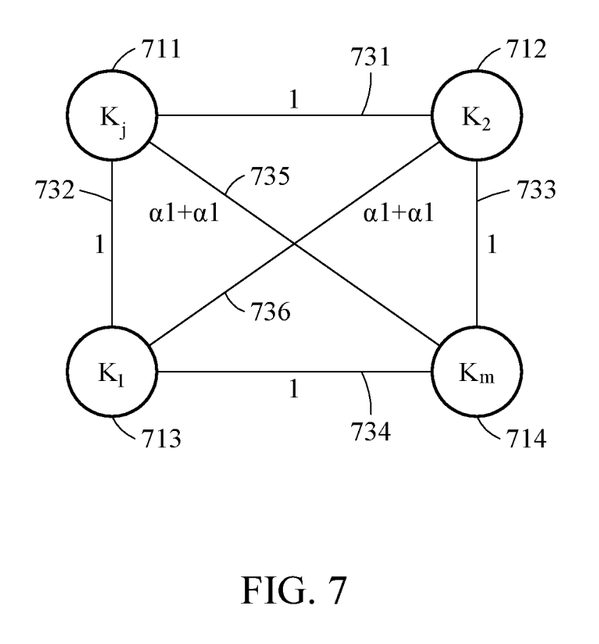
FIG. 7 illustrates an example of a graph generated using the example of FIG. 6.

FIG. 7 illustrates an example of a graph generated using the example of FIG. 6.

Referring to FIG. 7, the graph manager 210 may generate a graph including nodes 711 to 714 and edges 731 to 734 connecting the nodes 711 to 714, as described with reference to FIG. 6.

The graph manager 210 may generate the edges connecting the nodes 711 to 714 based on similarities between input data used by one or more operation kernels. The graph manager 210 may calculate a similarity based on the number of pieces of input data shared by one or more operation kernels, and generate an edge based on the similarity.

In the example of FIG. 7, the numerals written on the edges 731 to 734 may denote weights assigned to the edges 731 to 734 based on the similarities. The numeral on the edge 731 may denote a weight assigned to the edge 731 based on a similarity between the node 711 and the node 712. In other words, it may indicate that the node 711 and the node 712 share one piece of input data.

The graph manager 210 may assign an additional weight to a similarity based on locations at which the input data are stored. The graph manager 210 may assign the additional weight to the similarity when the input data are stored adjacent to each other.

In the example of FIG. 7, the node 711 and the node 714 share input data that are adjacent to each other in the memory 330. In this case, the graph manager 210 may assign an additional weight to the edge 735 connecting the node 711 and the node 714.

If the node 711 and the node 714 share two pieces of data, and the shared two pieces of data are adjacent to each other in the memory 300, the memory access cost may be additionally reduced. To reflect the additional reduction in the memory access cost in clustering, the graph manager 210 may assign a weight of α1+α1 to the edge 735. For example, the value of a1 may be greater than 1.

Similarly, when the input data shared by the node 712 and the node 713 are adjacent to each other in the memory 300, the graph manager 210 may assign an additional weight of α1+α1 to the edge 736 connecting the node 712 and the node 713.

The graph manager 210 may generate the kernel clusters by clustering the one or more operation kernels based on the graph.

When distributing repetitive unit kernel operations to cores to perform a single neural network operation, the graph manager 210 may perform clustering to assign unit kernels requiring the same input data to the same core.

If there are N cores, the graph manager 210 may divide the graph by N and generate N clusters. The graph manager 210 may generate kernel clusters by performing clustering so that nodes are assigned to the same core if an edge between the nodes is assigned a great weight.

The processor 200 may distribute one or more operation kernels and input data to cores using a multi-core-based code generated based on the generated kernel clusters.

The processor 200 may distribute one of the operation kernels to one of the cores based on the multi-core-based code, and store input data corresponding to the distributed operation kernel in a scratchpad memory connected to the core to which the operation kernel is distributed based on the multi-core-based code.

Figure 8:
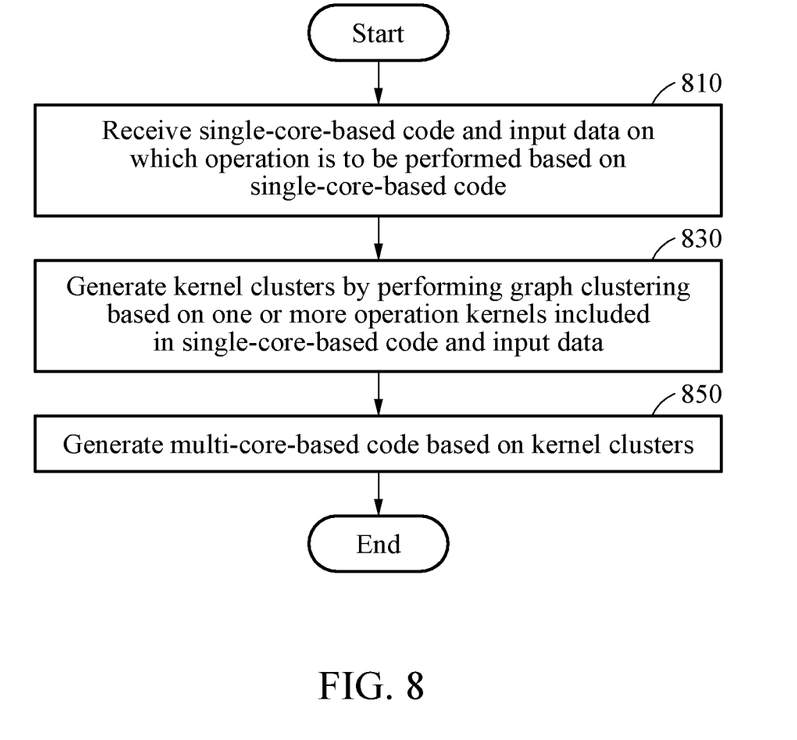
FIG. 8 illustrates an example of an operation of the compiling apparatus of FIG. 1.

FIG. 8 illustrates an example of an operation of the compiling apparatus of FIG. 1. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In an example, the operating method of FIG. 8 may be performed by a processor included in the compiling apparatus 10. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, the receiver 100 may receive a single-core-based code and input data on which an operation is to be performed based on the single-core-based code.

The input data may include an operand for the operation included in a neural network and a parameter of the neural network.

In operation 830, the processor 200 may generate kernel clusters by performing graph clustering based on one or more operation kernels included in the single-core-based code and the input data.

The processor 200 may generate a graph representing a relationship between the one or more operation kernels and the input data based on the operation kernels and the input data. The processor 200 may generate one or more nodes corresponding to the one or more operation kernels. The processor 200 may generate an edge connecting the nodes based on a similarity between input data used by the one or more operation kernels.

The processor 200 may calculate the similarity based on the number of pieces of input data shared by the one or more operation kernels. The processor 200 may assign an additional weight to a similarity based on locations at which the input data are stored. In detail, the processor 200 may assign the additional weight to the similarity in response to the input data being stored adjacent to each other. The processor 200 may generate the edge based on the calculated similarity.

The processor 200 may generate the kernel clusters by clustering the one or more operation kernels based on the generated graph. In operation 850, the processor 200 may generate a multi-core-based code based on the kernel clusters.

The processor 200 may distribute the one or more operation kernels and the input data to cores based on the generated multi-core-based code. The processor 200 may distribute one of the operation kernels to one of the cores based on the multi-core-based code.

The processor 200 may store input data corresponding to the one operation kernel based on the multi-core-based code.

The compiling apparatus 10, receiver 100, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the compiling method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A compiling method, comprising:
   receiving, a single-core neural network based code of an operation and a plurality of input data, each respective input data comprises an operand for the operation included in a neural network and a parameter of the neural network;
   generating a graph of the single-core neural network based code, wherein the generating of the graph comprises:
      generating a plurality of nodes, wherein each respective node corresponds to a respective operation kernel of a plurality of operation kernels of the single-core neural network based code; and
      generating a plurality of edges connecting the nodes based on a similarity between respective input data received by operation kernels, wherein the similarity is based on an amount of similar input data shared between respective operation kernels and a distance between storage locations at which the respective input data used by the operation kernels are stored;

generating kernel clusters, based on the generated graph, wherein the kernel clusters comprise operation kernels using similar input data;

generating, based on the kernel clusters, multi-core neural network based code for the operation;

distributing, based on the multi-core neural network based code, the operation kernels and the plurality of input data to respective cores for execution; and executing the operation through the cores.

2. The compiling method of claim 1, wherein generating the plurality of edges further comprises assigning an additional weight to the similarity based on locations at which respective input data received by the operation kernels are stored.

3. The compiling method of claim 2, wherein the assigning comprises assigning the additional weight to the similarity based on a distance between locations at which respective input data received by a first operation kernel and a second operation kernel of the plurality of operation kernels are stored.

4. The compiling method of claim 1, wherein the distributing comprises:

storing, based on the multi-core-based code, respective input data corresponding to the one operation kernel.

5. The compiling method of claim 1, wherein the graph further indicates a number of times that a first operation kernel and a second operation kernel of the plurality of operation kernels receive a same input data.

6. A non-transitory computer-readable storage medium storing instructions that, when executed by a processor, cause the processor to perform the steps of:

receiving, a single-core neural network based code of an operation and a plurality of input data, each respective input data comprises an operand for the operation included in a neural network and a parameter of the neural network;

generating a graph of the single-core neural network based code, wherein the generating of the graph comprises:

generating a plurality of nodes, wherein each respective node corresponds to a respective operation kernel of a plurality of operation kernels of the single-core neural network based code; and generating a plurality of edges connecting the nodes based on a similarity between respective input data received by operation kernels, wherein the similarity is based on the amount of similar input data shared between respective operation kernels and a distance between storage locations at which the respective input data used by the operation kernels are stored;

generating kernel clusters, based on the generated graph, wherein the kernel clusters comprise operation kernels using similar input data;

generating, based on the kernel clusters, a multi-core neural network based code for the operation;

distributing, based on the multi-core neural network based code, the operation kernels and the plurality of input data to respective cores for execution; and executing the operation through the cores.

7. An apparatus, comprising:

a processor configured to:

receive, a single-core neural network based code of an operation and a plurality of input data, each respective input data comprises an operand for the operation included in a neural network and a parameter of the neural network;

generate, a graph of single-core neural network based code, wherein the generating of the graph comprises:

generating a plurality of nodes, wherein each respective node corresponds to a respective operation kernel of a plurality of operation kernels of the single-core neural network based code; and generating a plurality of edges connecting the nodes based on a similarity between respective input data received by operation kernels, wherein the similarity is based on the amount of similar input data shared between respective operation kernels and a distance between storage locations at which the respective input data used by the operation kernels are stored;

generate kernel clusters, based on the generated graph, wherein the kernel clusters comprise operation kernels using similar input data;

generate, based on the kernel clusters, a multi-core neural network based code for the operation;

distribute, based on the multi-core neural network based code, the operation kernels and the plurality of input data to respective cores for execution; and execute the operation though the cores.

8. The apparatus of claim 7, wherein generating the plurality of edges further comprise, assign an additional weight to the similarity based on locations at which respective input data received by the operation kernels are stored.

9. The apparatus of claim 8, wherein the processor is further configured to assign the additional weight to similarity based on a distance between locations at which respective input data received by a first operation kernel and a second operation kernel of the plurality of operation kernels are stored.

10. The apparatus of claim 7, wherein the processor is further configured to:

store, based on the multi-core-based code, respective input data corresponding to the one operation kernel.

11. The apparatus of claim 7, wherein the processor is further configured to:

store the respective input data corresponding to the one operation kernel in a scratchpad memory connected to the one core.

12. The apparatus of claim 7, wherein the graph further indicates a number of times that a first operation kernel and a second operation kernel of the plurality of operation kernels receive a same input data.

* * * * *